United States Patent [19]

Loew et al.

[11] 4,040,779

[45] Aug. 9, 1977

[54] DRY HEAT PROCESS FO DYEING AND PRINTING ORGANIC MATERIAL WHICH CAN BE DYED WITH CATIONIC DYES

[75] Inventors: Peter Loew, Munchenstein; Raymond Défago, Riehen; Stefan Koller, Ramlinsburg, all of Switzerland

[73] Assignee: Ciba-Geigy AG, Basel, Switzerland

[21] Appl. No.: 586,132

[22] Filed: June 11, 1975

[30] Foreign Application Priority Data

June 12, 1974 Switzerland .......................... 8039/74
Feb. 13, 1975 Switzerland .......................... 1790/75

[51] Int. Cl.$^2$ .......................... D06P 3/00; D06P 5/00; D06P 3/70
[52] U.S. Cl. .......................... 8/2.5 R; 8/4; 8/41 A; 8/62; 8/168 A; 8/176; 8/177 AB
[58] Field of Search .......................... 8/2.5, 176, 177 AB

[56] References Cited

U.S. PATENT DOCUMENTS

| | | | |
|---|---|---|---|
| 2,755,200 | 7/1956 | Balon et al. | 117/36 |
| 3,347,865 | 10/1967 | Brack et al. | 260/313.1 |
| 3,642,823 | 2/1972 | Raue et al. | 260/326.15 |
| 3,847,607 | 11/1974 | Endo et al. | 96/1.6 |

FOREIGN PATENT DOCUMENTS

| | | |
|---|---|---|
| 7,009,621 | 4/1970 | Japan |
| 6,917,952 | 6/1970 | Netherlands |
| 1,342,304 | 1/1974 | United Kingdom |

OTHER PUBLICATIONS

Keaton and Preston, J. Soc. Dyers and Colourists, 1964 (June), pp. 312–322.
Ellis, "Printing Inks" (Reinhold, New York) 1940, p. 158.
Nelson, J. Optical Soc. America, 1956, 46, pp. 13–16.
Morre, J. Soc. Dyers and Colourists, 1974, Sept. pp. 318–325.

*Primary Examiner*—Harry Wong, Jr.
*Assistant Examiner*—A. L. Clingman
*Attorney, Agent, or Firm*—Wenderoth, Lind & Ponack

[57] ABSTRACT

A dry heat process for dyeing and printing organic material which can be dyed with cationic dyes, which process comprises the use of carbinol bases of cationic dyes or derivatives thereof, together with at least one indicator dye.

21 Claims, No Drawings

DRY HEAT PROCESS FO DYEING AND PRINTING ORGANIC MATERIAL WHICH CAN BE DYED WITH CATIONIC DYES

The present invention provides a dry heat process for dyeing and printing organic material which can be dyed with cationic dyes, especially synthetic fibrous material made from polyacrylonitrile and modacryl, the dyeing preparations and carriers suitable therefor as well as the organic material which is dyed and printed by the novel process.

Transfer printing processes are known which consist on dyeing and printing synthetic fibres, especially polyester fibres, but also polyacrylonitrile fibres, at temperatures of c. 190° C to 220° C over the course of 10 to 60 seconds, with disperse dyes which are converted into the vapour state at atmospheric pressure and at temperatures between 150° C and 220° C. In this dry heat transfer of disperse dyes from an inert carrier, e.g. paper, to textiles, better colour yields in conjunction with improved fastness properties of the resultant dyeings are obtained with higher temperatures and a longer heat treatment. However, when using polyacrylonitrile fibres, a distinct and undersirable hardening of the fibres usually occurs under transfer conditions which are advantageous for disperse dyes, i.e. depending on the duration of action at temperatures of 190° C and above. In addition, the dyeings and prints obtained with disperse dyes do not have the brilliance that is usually obtained on such materials with cationic dyes. However, at temperatures of 120° C and 190° C, and, at very short action times, of up to 210° C, i.e. under conditions that cause virtually no damage to the polyacrylonitrile fibres, disperse dyes yield only dyeings which are faint, partly of poor fastness, especially of poor fastness to rubbing, and therefore useless.

For dyeing polyacrylonitrile fibres by conventional aqueous methods, the ordinary commercially available cationic dyes are used principally in the form of their salts with strong inorganic acids, for example as chlorides, bromides, methane sulphates or zinc chloride double salts. The vapour pressures of these ordinary, commercially available dye salts are very low at temperatures below 200° C at atmospheric pressure. Unless steam and moist textile material are used, they produce therefore on polyacrylonitrile fibres faint dyeings or no dyeings at all in the dry transfer printing process at temperatures of 150° C to 210° C.

German Offenlegungsschrift 2.325.308 describes the use of cationic dyes together with oxidants and Belgian Pat. No. 808.059 the use of salts of cationic dyes with acids having a $pK_s$ value greater than 3 for producing strong and fast dyeings and prints by dry heat processes, especially on synthetic fibrous material of acid-modified polyacrylonitrile. Both these processes require a double reaction which takes place advantageously in situ direct on the carrier or by the action of dry heat during the heat transfer process. Moreover, strong electrolyte salts are formed which can have detrimental effects.

A process has now been found which makes it possible, in simple manner and avoiding the difficulties and disadvantages mentioned hereinbefore, to effect on organic material that can be dyed with cationic dyes, especially synthetic fibrous material of acid-modified polyacrylonitile, dyeings and prints which are dry, strong and fast, in particular fast to light. This novel dry, heat process consists in using the carbinol bases of cationic dyes, advantageously in finely divided form, for dyeing and printing.

The surprising observation was made that the carbinol bases of cationic dyes used according to the invention can be transferred without decomposing and produce strong and fast dyeings and prints on organic material which can be dyed with cationic dyes by means of the transfer printing process. In comparison to the known cationic dye salts, the carbinol bases of cationic dyes have in addition the great advantage that they can be applied in salt-free form and usually in the form of dispersions to the carriers necessary for the heat transfer process. In contradistinction to solutions, dispersions fill in the microroughnesses on paper — which is advantageous — and also dispersion particles do not penetrate so deeply into the transfer paper as happens with dissolved dyes, so that the transfer yield is thereby increased.

However, this process has the drawback that the deprotonised cationic dyes have to a large extent a different shade from the salt form of these compounds or else are colourless. The consequences are:

When printing multicoloured designs, these can assume an entirely different character on the carrier through pronounced shades receding and background shades becoming dominant. When this occurs, the printer is no longer able to adjust roller pressure, speed, and other variables in connection with printing to an optimum production of the print.

The recognition of printing errors (blade streaks, distortions, too fat or too meagre a print) during the printing procedure is very greatly hindered with such temporarily occuring pale shades and quite impossible if a very light or even colourless print results.

It is not readily possible to establish serious errors in the colour preparation or entirely possible mistakes in colour (red instead of blue, for example). Only a subsequent transfer print on the textile material, when the original colour reappears, makes a sampling possible and this is expensive and time-consuming.

It has now been found that it is possible to avoid in simple manner these disadvantages of the cited novel process by adding to the carbinol bases and the derivatives thereof at least one indicator dye, advantageously in amounts of 0.1 to 10 percent by weight, based on the amount of the carbinol base or derivative thereof employed.

The invention therefore provides a dry heat transfer printing process for dyeing or printing organic material which can be dyed with cationic dyes, especially synthetic fibrous material made from acid-modified polyacrylonitrile, which process comprises the use of carbinol bases of cationic dyes, or derivatives thereof, advantageously in finely divided form, together with indicator dyes. The indicator dye should desirably not effect any acid reaction, since otherwise the deprotonised compounds might be converted into the salt form beforehand and not, as desired, only on the printing substrate.

According to the invention, it is advantageous to use carbinol bases of cationic dyes and derivatives thereof whose chromophoric systems are derived from cationic diphenylmethane, triphenylmethane, diphenylindolyl and naphtholactam dyes and whose cationic character derives from a carbonium group.

Suitable carbinol bases, or derivatives thereof, of diphenylmethane or diphenylindolyl dyes are, for example those of the general formula

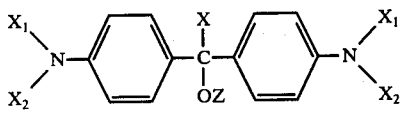

wherein X is hydrogen, alkyl of 1 to 4 carbon atoms or an indole radical, and $X_1$, $X_2$ and Z are radicals which are the same or different, such as hydrogen, alkyl of 1 to 4 carbon atoms, cycloalkyl, cyanoalkyl, hydroxyalkyl or an aralkyl or aryl radical which is unsubstituted or substituted, or $X_1$ and $X_2$ can be linked together and form part of a saturated heterocyclic ring system, such as a pyrrolidine or piperidine ring, or $X_1$ and $X_2$ with an unsubstituted position at the aromatic ring can form a heterocycle, e.g. substituted tetrahydroquinolines or substituted indolines.

Examples of particularly suitable carbinol bases of triphenylmethane dyes are the carbinol bases of the following formulae:

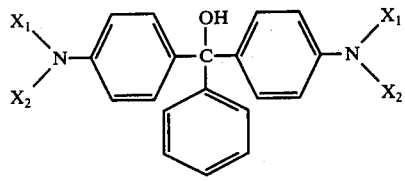

wherein $X_1$ and $X_2$ have the meanings previously assigned to them,

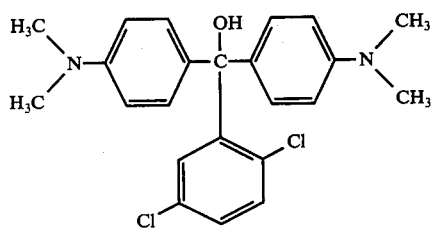

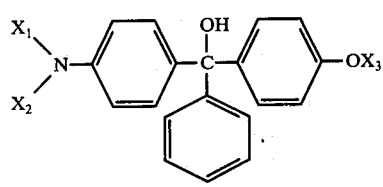

wherein $X_1$ and $X_2$ have the meanings previously assigned to them and the third aryl ring can also be substituted, and $X_3$ has the same meaning as $X_1$ and $X_2$ or is hydrogen,

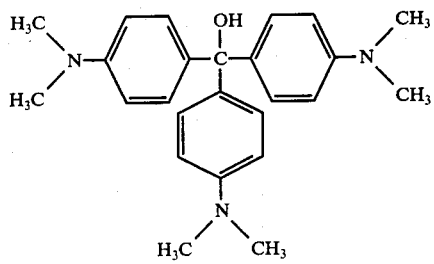

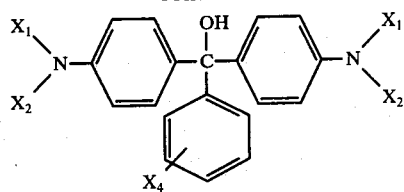

wherein $X_1$ and $X_2$ have the meanings previously assigned to them and $X_4$ is hydrogen, halogen, $OX_3$, wherein $X_3$ has the meaning as stated above, or

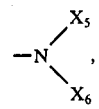

wherein $X_5$ and $X_6$ have the same meanings as $X_1$ and $X_2$, and

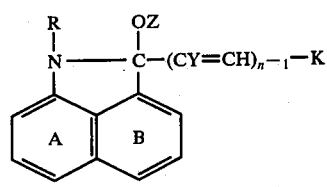

wherein $X_1$ and $X_2$ have the meanings previously assigned to them.

Particularly suitable carbinol bases, or derivatives thereof, of naphtholactam dyes are those of the general formula I (I)

$$\underset{A}{\overset{R}{N}}\underset{B}{\overset{OZ}{C}}-(CY=CH)_{n-1}-K$$

wherein R and Z are unsubstituted or substituted alkyl, cycloalkyl, aryl or aralkyl or Z is hydrogen, K is the radical of a compound which is able to couple, Y is lower alkyl, cyano or preferably hydrogen, and n is 1 or 2, and wherein the rings A and B are unsubstituted or substituted.

The radical R can be, for example, one of the following groups: alkyl of 1 to 6 carbon atoms, cycloalkyl, phenyl, benzyl or β-phenylethyl. These groups, especially the alkyl radicals, can be substituted by halogen, low molecular alkoxy, dialkylamino, cyano, alkanoyl, alkanoylamino, carbalkoxy, alkoxycarbonylamino or alkylarylamino.

The rings A and B of the naphtholactam can carry non-ionogenic substituents or be unsubstituted. Examples of suitable substituents are: halogen, especially chlorine or bromine; low molecular alkyl, alkoxy, dialkylamino or alkylarylamino, e.g. methyl, ethyl, butyl, methoxy, ethoxy, dimethylamino, methylethylamino or ethylphenylamino; acyl and acylamino radicals, especially low molecular alkanoyl, alkanoylamino, alkoxycarbonyl, alkoxycarbonylamino, alkylated carbonamido and ureido groups, e.g. acetyl, acetylamino, benzoylamino, ethoxycarbonylamino or dimethylaminocarbonylamino, sulphonyl or aminosulphonyl radicals, in particular alkylsulphonyl, arylsulphonyl or dialkylaminosulphonyl radicals, e.g. methylsulphonyl, phenylsulphonyl or dialkylaminosulphonyl radicals, such as methylsulphonyl, phenylsulphonyl or dimethylaminosulphonyl. Throughout this specification, the term "low molecular" is to be understood generally as meaning radicals of 1 to 4 carbon atoms.

A group of preferred carbinol bases of naphtholactam dyes or derivatives thereof are those of the general formula II

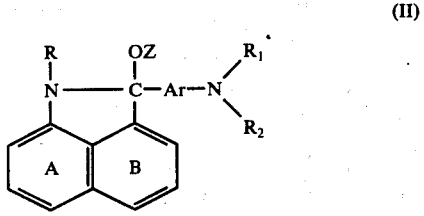

wherein Ar is an aromatic radical and each of $R_1$, $R_2$ and Z is a substituted or an unsubstituted alkyl, aryl, cycloalkyl, aralkyl group or hydrogen and R, A and B have the same meanings as in formula I.

Preferably Ar is an unsubstituted phenylene radical or a phenylene radical which is substituted by low molecular alkyl or alkoxy groups, $R_1$ and $R_2$ are principally low molecular alkyl radicals or radicals of the benzene class and can be substituted by the following groups: halogen, cyano, alkoxy of 1 to 4 carbon atoms, alkyl of 1 to 4 carbon atoms, low molecular dialkylamino or alkylarylamino, e.g. methylphenylamino, or acyl groups, e.g. alkanoyl of 1 to 4 carbon atoms, benzoyl or carbalkoxy. Further suitable radicals $R_1$ and $R_2$ are cyclohexyl, cyclopentyl, benzyl and β-phenylethyl. In addition, $R_1$ and $R_2$ can be linked together and form part of a saturated heterocyclic ring system, such a pyrrolidine or piperidine ring, or $R_1$ and $R_2$ with an unsubstituted position at the aromatic ring can form a heterocycle, e.g. substituted tetrahydroquinolines or substituted indolines.

A further group of preferred carbinol bases of naphtholactam dyes or derivatives thereof comprises those of the general formula III

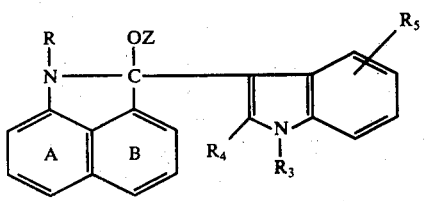

wherein $R_3$ and Z are hydrogen, aryl, aralkyl or substituted or unsubstituted alkyl or alkenyl, $R_4$ is hydrogen, aryl or low molecular alkyl and $R_5$ is low molecular alkyl or alkoxy or halogen, and R, A and B have the same meanings as in formula I. $R_3$ is in particular a phenyl, tolyl, benzyl, β-phenylethyl radical or a $C_1$–$C_{18}$ alkyl or alkenyl radical which is unsubstituted or substituted by chlorine, cyano or low molecular carbalkoxy or alkylcarbonamido groups.

The carbinol bases of cationic dyes and derivatives thereof are electroneutral. They are obtained by treating the corresponding cationic dyes with bases, such as alkali hydroxides, especially potassium hydroxide, or alkali alcoholates, especially sodium methylate, in aqueous, aqueous-organic or organic solution, and isolating the resultant carbinol bases of cationic dyes, e.g. by filtration, and drying them, or by optionally etherifying the resultant carbinol bases.

The indicator dyes to be used according to the invention can belong to the most diverse classes. For example, they can be disperse dyes, pigment dyes, vat dyes or reactive dyes. Dyes with acid reaction are not advantageous.

It is advantageous to use those indicator dyes or dyestuff mixtures as defined herein which have the same shade as that of the carbinol base after conversion into its salt form and which do not themselves transfer into the textile material.

It is particularly advantageous to use as indicator dye the salt form of the carbinol base. It is desirable to use the indicator dye in amounts of 0.1 to 10, advantageously 0.5 to 1.5, percent by weight, based on the amount of the carbinol base.

Examples of organic materials which can be dyed with cationic dyestuffs and which can be dyed or printed according to the present invention, are: tannin-treated cotton, leather, wool, polyamides, such as polyhexamethylenediamine adipate, poly-ε-caprolactam or poly-ω-aminoundecanoic acid, polyesters, such as polyethylene glycol terephthalate or polycyclohexanedimethylene terephthalate, but above all acid-modified synthetic fibres, especially acid-modified polyamides, e.g. polycondensation products of 4,4'-diamino-2,2'-diphenyldisulphonic acid or 4,4'-diamino-2,2'-diphenylalkanedisulphonic acids with polyamide forming starting materials, polycondensation products of mono-aminocarboxylic acids or their amide forming derivatives or of dibasic carboxylic acids and diamines with aromatic dicarboxysulphonic acids, e.g. polycondensation products of ε-caprolactam or hexamethylenediammonium adipate with potassium-3,5-dicarboxybenzenesulphate, or acid-modified polyesters fibres, such as polycondensation products of aromatic polycarboxylic acids, for example terephthalic or isophthalic acid, polyhydric alcohols, e.g. ethylene glycol, and 1,2- or 1,3-dihydroxy-3-(3-sodium sulphopropoxy)-propane, 2,3-dimethylol-1-(3-sodium sulphopropoxy)-butane, 2,2-bis-(3-sodium sulphopropoxyphenyl)-propane or 3,5-dicarboxybenzenesulphonic acid or sulphonated terephthalic acid, sulphonated 4-methoxy-benzene-carboxylic acid or sulphonated diphenyl-4,4'-dicarboxylic acid. Preferred, however, are polyacrylonitrile fibres (containing at least 85% acrylonitrile) and modacryl fibres. In the polymerisation of acrylonitrile and comonomers, persulphate radicals (deriving from the usual catalyst systems) consisting of potassium persulphate, potassium metasulphite and ferriammonium sulphate, are built into the chain ends as regulators. In addition to acrylonitrile, other vinyl compounds are normally used as comonomers, e.g. vinylidene chloride, vinylidene cyanide, vinyl chloride, methacrylic amide, vinyl pyridine, methylvinyl, pyridine, N-vinylpyrrolidone, vinyl acetate, vinyl alcohol, methylmethacrylate, styrenesulphonic acid or vinylsulphonic acid.

Provided the devices suitable for the purpose are available, the fibre material can be dyed according to the invention any in desired form, for example in the form of flocks, slubbing, yarn, texturised fibres, woven fabrics, knitted fabrics, non-wovens from fibres, ribbons, webs, textile floor coverings, such as woven needle felt carpets or hanks of yarn which can be in the form of webs or are cut or ready finished, but also in the form of sheets. The fibre material can also be in the form of fibre blends or blended fabrics.

The process according to the invention can be carried out, for example, in the following way: Printing inks which contain at least one finely divided carbinol base of a cationic dye or a derivative thereof together with an indicator dye, optionally a binder which is stable below 230° C, water and/or an organic solvent, are applied to an inert carrier and dried, then the treated side of the carrier is brought into contact with the surface of the organic material to be dyed, carrier and material are subjected, optionally under mechanical pressure, to a heat treatment of 150° C to 230° C, advantageously 170° C to 210° C, over the course of 5 to 60 seconds, and the dyed material is then separated from the carrier.

The inert intermediate or auxiliary carrier required for the dry heat transfer, i.e. a carrier for which the carbinol bases of cationic dyes used according to the invention have no affinity, is advantageously a flexible, preferably three-dimensionally stable sheet material, such as a ribbon, strip, or a foil with appropriately smooth surface, which is stable to heat and can consist of the most varied kinds of material, above all non-textile material, e.g. metal, such as a steel or aluminum sheet, or an endless ribbon of stainless steel, plastic or paper, preferably pure non-lacquered cellulose parchment paper which can optionally be coated with a film of vinyl resin, ethyl cellulose polyurethane resin or teflon.

If necessary the printing inks used according to the invention also contain in addition to the carbinol bases of cationic dyes or the derivatives thereof and indicator dyes defined herein at least one binder that is stable below 230° C and acts as thickener for the printing batch and as at least temporary binder for the dye on the carrier to be printed. Synthetic, semisynthetic, and natural resins, i.e. both polymerisation and polycondensation and polyaddition products, are suitable as such binders. In principle, it is possible to use all resins and binders customarily used in the printing ink and paint industry. The binders should not melt at the transfer temperature, react chemically in the air or with themselves (e.g. cross-link), have little or no affinity of the electroneutral, deprotonised cationic dyes used, solely maintain these at the printed area of the inert carrier without modifying them, and remain on the carrier in their entirety after the heat transfer process. Preferred binders are those that are soluble in organic solvents and that dry rapidly for example in a warm current of air and form a fine film on the carrier. Suitable water-soluble binders are: alginate, tragacanth, carubin (from locust bean gum), dextrin, more or less etherified or esterified mucilages, hydroxyethyl cellulose or carboxymethyl cellulose, water-soluble polyacrylic amides or, above all, polyvinyl alcohol: and suitable binders that are soluble in organic solvents are cellulose esters, such as nitrocellulose, cellulose acetate or butyrate, and, in particular, cellulose ethers, such as methyl, ethyl, propyl, isopropyl, benzyl, hydroxypropyl, or cyanoethyl cellulose, and also mixtures thereof.

When using dispersions, the carbinol bases of cationic dyes dispersed in the printing ink must have principally a particle size of $\leq 10\mu$, preferably $\leq 2\mu$.

Besides water, practically all water-miscible and water-immiscible organic solvents or solvent mixtures are suitable which boil at atmospheric pressure at temperatures below 220° C, preferably below 150° C, and which have sufficient solubility or emulsifiability (dispersibility) for the carbinol bases of cationic dyes and the binders used. The following may be cited as examples of suitable organic solvents: aliphatic and aromatic hydrocarbons, e.g. n-heptane, cyclohexane, petroleum ether, benzene, xylene or toluene, halogenated hydrocarbons, e.g. methylene chloride, trichloroethylene, perchloroethylene or chlorobenzene, nitrated aliphatic hydrocarbons, e.g. nitropropane, aliphatic amides, e.g. dimethyl formamide or mixtures thereof, also glycols, e.g. ethylene glycol or ethylene glycol monoalkyl ethers, e.g. ethylene glycol monoethyl ether, diethyl carbonate, dimethyl carbonate, or esters of aliphatic monocarboxylic acids, e.g. ethyl acetate, propyl acetate, butyl acetate, $\beta$-ethoxyethyl acetate, aliphatic or cycloaliphatic ketones, for example methyl ethyl ketone, methyl isobutyl ketone, cyclohexanone, isophoron, mesityl oxide, or diacetone alcohol and alcohols, e.g. methanol, ethanol, and, preferably, n-propanol, isopropanol, n-butanol, tert. butanol, sec. butanol, or benzyl alcohol; also suitable are mixtures of the cited solvents, e.g. a mixture of methyl ethyl ketone and ethanol in the ratio 1:1.

Particularly preferred solvents are esters, ketones, or alcohols which boil below 120° C, e.g. butyl acetate, acetone, methyl ethyl ketone, ethanol, isopropanol or butanol. Virtually anhydrous printing inks are used with advantage.

The desired viscosity of the printing inks can be adjusted by addition of the cited binders, or by dilution with water or a suitable solvent.

The liquid, pasty or dry dyeing preparations contains as a rule 0.01 to 80, advantageously 1 to 30, percent by weight of at least one or more carbinol bases of cationic dyes or derivatives thereof, 0.1 to 10 percent by weight of one or more indicator dyes and optionally 0.5 to 50 percent by weight of a binder, based on the total weight of the preparation, and they can be used direct or after dilution as printing inks according to the invention.

The suitability of the printing inks can be improved by adding optional components, for example plasticisers, swelling agents, high boiling solvents such as e.g. tetralin or decalin, iogenic or non-ionogenic surface active compounds, for example the condensation products of 1 mol of octylphenol with 8 to 10 mols of ethylene oxide.

The dyeings preparation and printing inks (solutions, dispersions, emulsions) used according to the invention are manufactured by methods which are known per se by dissolving or dispersing the carbinol bases of cationic dyes or the derivatives thereof together with the indicator dyes in water and/or a solvent or a solvent mixture, advantageously in the presence of a binder which is stable below 230° C.

The optionally filtered printing inks are applied to the inert carrier for example by spraying, coating, or advantageously by printing the carrier on parts of the surface or over the entire surface. It is also possible to apply a multicoloured plattern or to print successively in a base shade and subsequently with similar or different patterns.

After the printing inks have been applied to the inert carrier, these are then dried, e.g. with the aid of a flow of warm air or by infrared irradiation, optionally with recovery of the solvent employed.

The carriers can also be printed on both sides, whereby it is possible to select dissimilar colours and/or patterns for both sides. In order to avoid using a printing machine, the printing inks can be spraying onto the auxiliary carrier, for example by using a spray gun. Particularly interesting effects are obtained if more than one shade is printed or sprayed onto the auxiliary carrier simultaneously. Furthermore, specific patterns can be obtained for example by using stencils or artistic patterns by using a brush. If the carriers are printed, the most diverse printing methods can be employed, for example relief printing (e.g. letterpress printing, flexographic printing), intaglio printing (e.g. roller printing), silk-screen printing (e.g. rotary screen printing, flat-screen printing) or electrostatic printing.

The transfer is performed in the conventional manner by the action of heat. The treated carriers are brought into contact with the textile materials and kept at 120° C to 210° C until the carbinol bases of cationic dyes or the derivatives thereof applied to the carrier are transferred to the textile material. As a rule 5 to 60 seconds suffice for this.

The heat can be applied in various known ways, e.g. by passage through a hot heater drum, a tunnel-shaped heating zone or by means of a heated cylinder, advantageously in the presence of an unheated or heated backing roll which exerts pressure or of a hot calendar, or also by means of a heated plate (iron or warm press), the various devices being preheated by steam, oil, infrared irradiation or microwaves to the required temperature, optionally under vacuum, or being located in a preheated heating chamber.

Upon completion of the heat treatment the printed goods are removed from the carrier. The printed material requires no aftertreatment, neither a steam treatment to fix the dyestuff nor washing to improve the fastness properties.

Compared with known processes, the process according to the invention has notable advantages. It has in particular the principal advantage of the now largely solved problem of achieving strong, brilliant dyeings and prints which are fast to wet treatments and light on polyacrylonitrile fibres while maintaining optimum mechanical fibre properties. Compared with the prints obtained in known manner with cationic dyes, those obtained by the novel process are characterised by sharp, finely etched contours. They are more brilliant and faster, especially faster to sublimation, than those obtained with disperse dyes.

The following Examples illustrate the invention but do not limit it to what is described therein. The parts and percentages are by weight.

EXAMPLE 1 a. The following ingredients are ground, with cooling, for 2 hours in a ball mill and simultaneously homogenised: 5 parts of the carbinol base of the formula

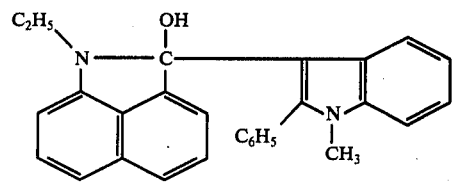

0.5 part of the red indicator dye of the formula

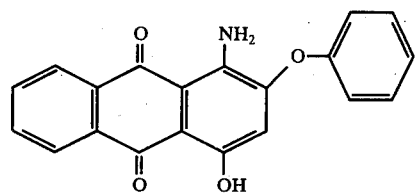

6.0 parts of ethyl cellulose and 88.5 parts of ethanol. After removal of the grinding elements a ready for use printing ink is obtained.

b. The above printing ink is applied to the entire surface of a smooth parchment paper by printing and subsequently dried. A carrier paper suitable for the transfer printing process is obtained in this way.

c. A polyacrylonitrile fabric (ORLON) is laid on the pretreated carrier and brought into contact with the treated side of the carrier, after which carrier and fabric are heated for 30 seconds to 200° C using a heating plate. A second, insulated plate which is not heated ensures uniform contact. The dyed fabric is then separated from the carrier. A polyacrylonitrile fabric which is dyed a strong red shade of excellent wet and good light fastness is obtained.

EXAMPLE 2

13.8 parts of 4-bromo-N-ethyl-naphtholactam-(1,8) and 7.4 parts of diethyl aniline are stirred together with 38 parts of phosphoroxy chloride for 15 hours at 80° C. The reaction mass is then poured onto 400 parts of ice and the pH is adjusted to 4 with concentrated ammonia solution. The deep blue dye salt is then converted into the colourless, water-insoluble carbinol by the dropwise addition of 2 normal sodium hydroxide solution. The carbinol is filtered off, washed with water and dried in vacuo. With cooling, 5 parts of this colourless carbinol base of the formula

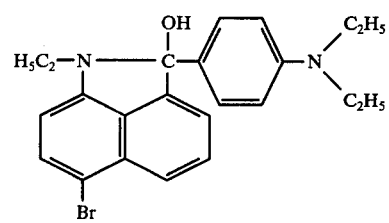

0.15 part of the blue dye of the formula

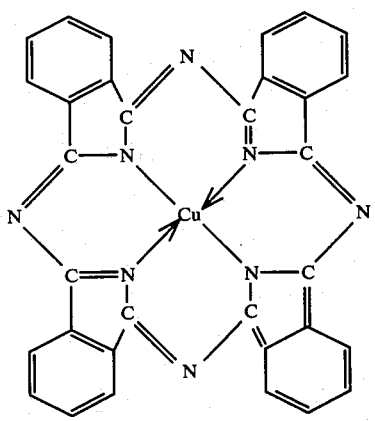

6 parts of ethyl cellulose and 88.5 parts of ethanol are ground for 2 hours in a ball mill and simultaneously homogenised. A ready for use printing ink is obtained after separation of the grinding elements. A polyacrylonitrile fabric which is dyed a strong blue shade of excellent fastness properties is obtained by carrying out the further procedure as described in Example 1b and 1c.

EXAMPLES 3 TO 42

The carbinol bases listed in the Table below can be manufactured in a manner analogous to that described in Example 2. The final column of the Table indicates the shades of the strong dyeings or prints which are fast to light and wet treatment also obtained on polyacrylonitrile fibres (ACRYLAN, regular type 36), modacryl fibres (ORLON, type 44), (ZEFRAN, type 100) or on fibre blends of polyacrylonitrile/wool, by using instead of the carbinol base of Example 1 corresponding amounts of one of the carbinol bases listed in the Table and of the general formula given below and to which an indicator dye corresponding to the shade after the development has been added, and otherwise carrying out the procedure as described in Example 1b and 1c.

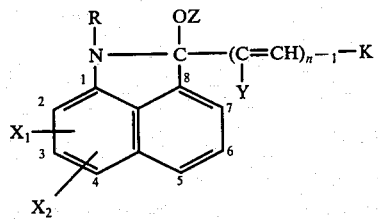

| Example | R | $X_1$ | $X_2$ | Z | Y | n | K | Shade after development |
|---|---|---|---|---|---|---|---|---|
| 3 | $H_3C-$ | H | H | H | H | 1 | _2) | violet |
| 4 | $H_3C-$ | 2-Br | 4-Br | H | H | 1 | " | reddish blue |
| 5 | $H_5C_2-$ | 4-$NO_2$ | H | H | H | 1 | " | blue |
| 6 | $H_3C-$ | 4-$SO_2N(CH_3)_2$ | H | H | H | 1 | " | blue |
| 7 | $H_3C-$ | 4-$NHCOCH_3$ | H | H | H | 1 | (C_6H_4-)) | reddish blue |
| 8 | $H_3C-$ | 4-$SO_2CH_3$ | H | H | H | 1 | _2) | blue |
| 9 | $H_3C$ | 4-$H_3CCO-$ | H | H | H | 1 | " | blue |
| 10 | $H_3C$ | 4-$NHCONH_2$ | H | H | H | 1 | " | reddish blue |
| 11 | $NC-C_2H_4-$ | H | H | H | H | 1 | " | reddish blue |
| 12 | $Cl-C_2H_4-$ | 4-Br | H | H | H | 1 | (C_6H_5)) | reddish blue |
| 13 | $C_6H_5CH_2-$ | 2-$H_3C-$ | H | H | H | 1 | _2) | violet |

-continued

| Example | R | $X_1$ | $X_2$ | Z | Y | n | K | Shade after development |
|---|---|---|---|---|---|---|---|---|
| 14 | H₃CNHCOC₂H₄— (with C=O) | H | H | H | H | 1 |  —N(CH₃)₂ | violet |
| 15 | H₃COC₂H₄— | 2-C₂H₅ | H | H | H | 1 | " | violet |
| 16 | H₂NCOC₂H₄— | H | H | H | H | 1 | " | violet |
| 17 | CH₃— | H | H | H | H | 2 | " | greenish blue |
| 18 | C₃H₇— | 4-Cl | H | H | H | 2 | 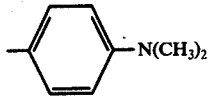 | blue |
| 19 | C₂H₅— | 4-OCH₃ | H | H | H | 2 | 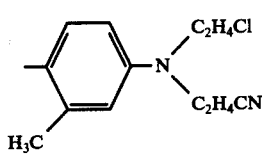 | reddish blue |
| 20 | H₃C | H | H | H | —CH₃ | 2 | 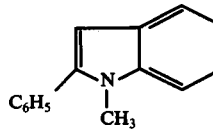 —N(CH₃)₂ | greenish blue |
| 21 | H₃C | H | H | H | HC(CH₃)₂ | 2 | " | greenish blue |
| 22 | H₃C | H | H | H | —CN | 2 | " | greenish blue |
| 23 | C₂H₅— | H | H | H | H | 1 | 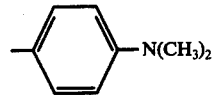 —N(C₂H₄CN)₂ | bluish red |
| 24 | C₂H₅ | 4-Br | H | H | H | 1 |  | violet |
| 25 | C₂H₅— | H | H | H | H | 1 | 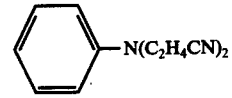 | reddish violet |
| 26 | C₂H₅— | H | H | H | H | 1 | 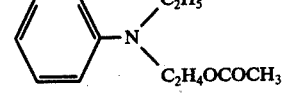 | bluish red |
| 27 | C₂H₅— | 4-SO₂NHCH₃ | H | H | H | 1 | 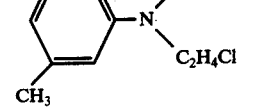 | blue |
| 28 | H₃C— | H | H | H | H | 1 | 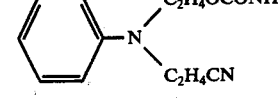 | reddish violet |

-continued
| Example | R | $X_1$ | $X_2$ | Z | Y | n | K | Shade after development |
|---|---|---|---|---|---|---|---|---|
| 29 | $H_3C-$ | 4-Br | H | H | H | 1 | 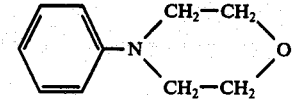 | reddish blue |
| 30 | $C_2H_5-$ | H—Br | H | H | H | 1 | 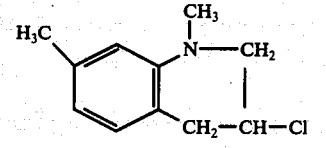 | blue |
| 31 | $C_2H_5$ | 4-Cl | 2-Cl | H | H | 1 | 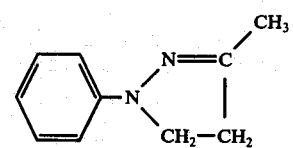 | greenish blue |
| 32 | $C_2H_5$ | H | H | H | H | 1 | 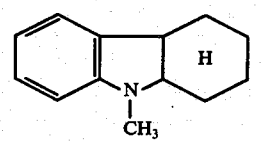 | blue |
| 33 | $H_3C-$ | 2-$C_2H_5$ | H | H | H | 1 | 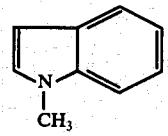 | yellow red |
| 34 | $C_2H_5-$ | H | H | H | H | 1 | 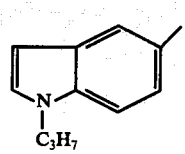 | yellow red |
| 35 | $C_2H_5-$ | H | H | H | H | 1 | 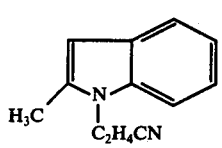 | yellow red |
| 36 | $NCC_2H_4-$ | 4-Br | H | H | H | 1 | 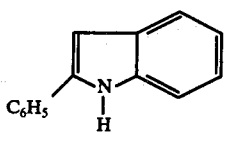 | red |
| 37 | $C_2H_5$ | H | H | H | H | 1 | 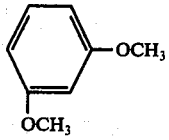 | orange |
| 38 | $C_2H_5-$ | H | H | H | H | 1 | 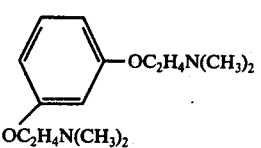 | reddish yellow |
| 39 | $H_3C-$ | 4-Br | H | H | H | 1 | 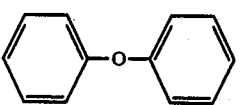 | orange |

-continued

| Example | R | $X_1$ | $X_2$ | Z | Y | n | K | Shade after development |
|---|---|---|---|---|---|---|---|---|
| 40 | $H_3C-$ | H | H | H | H | 1 | 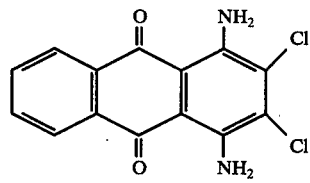 | orange |
| 41 | $H_3C-$ | 4-Br | H | H | H | 1 | | blue |
| 42 | $H_5C_2$ | 4-Br | H | H | H | 1 | | blue |
| 43 | $H_5C_2-$ | H | H | $-CH_3$ | H | 1 | | violet |
| 44 | $H_5C_2-$ | H | H | $-C_2H_5$ | H | 1 | " | violet |

EXAMPLE 45

With cooling, 5 parts of the carbonol base of the formula

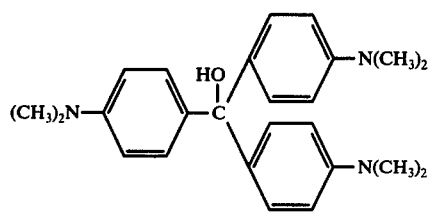

or of the formula

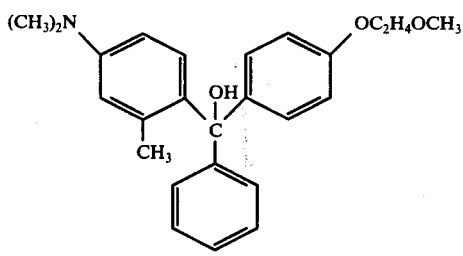

6.5 parts of ethyl cellulose, 0.15 part of the violet indicator dye of the formula and 88 parts of ethyl alcohol are ground for 2 hours in a glass bead mill to give a suspension.

A carrier suitable for the transfer printing process is obtained by printing the resultant printing ink on transfer paper. The printed carrier paper is laid on a polyacrylonitrile fabric, whereupon fabric and carrier are brought into contact for 30 seconds at 200° C using a heating plate. A second, unheated insulated plate ensures uniform contact. The dyed polyacrylonitrile fabric is then separated from the carrier. A strong, violet print is obtaind. Strong prints on polyacrylonitrile fabric are also obtained in the shades indicated in column 3 of the following Table by substituting for the carbinol base in Example 45 corresponding amounts of one of the carbinol bases listed in column 2 and otherwise carrying out the procedure described in this Example after addition of corresponding amounts of an indicator dye, e.g. the carbinol base of the cationic dye in its salt form.

Table

| Example | Carbinol base | Shade on polyacrylonitrile |
|---|---|---|
| 46 | 4-(N-ethyl-N-(2-methoxyethyl)amino)phenyl — C(OH) — (4-methoxyphenyl) — phenyl | red |
| 47 | 4-(N-methyl-N-benzylamino)phenyl — C(OH) — (4-methoxyphenyl) — phenyl | red |
| 48 | diphenyl — C(OH) — (4-dimethylaminophenyl) | yellow |
| 49 | bis(4-dimethylaminophenyl) — C(OH) — (4-dimethylaminophenyl) | — |
| 50 | bis(4-dimethylaminophenyl)(with 2-methyl on one ring) — C(OH) — (4-dimethylaminophenyl) | violet |
| 51 | 4-(diethylamino)phenyl — C(OH) — (2-methylphenyl) — (4-methoxyphenyl) | red |
| 52 | 4-(diethylamino)phenyl — C(OH) — (2-methylphenyl) — (4-ethoxyphenyl) | red |

Table-continued

| Example | Carbinol base | Shade on polyacrylonitrile |
|---|---|---|
| 53 | (structure) | bluish red |
| 54 | (structure) | blue |
| 55 | (structure) | red |

EXAMPLE 56

With cooling, 5 parts of the carbinol base of the formula

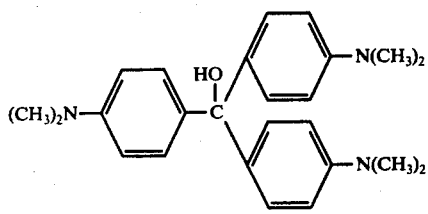

6.5 parts of ethyl cellulose, 0.15 part of the violet indicator dye of the formula

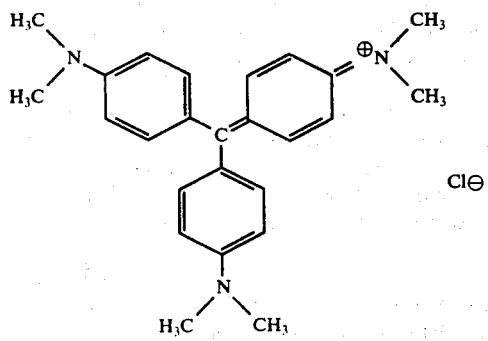

and 88 parts of ethyl alcohol are ground for 2 hours in a glass bead mill to give a suspension.

A carrier paper suitable for the transfer printing process is obtained by printing the resultant printing ink on transfer paper. The printed carrier paper is laid on a polyacrylonitrile fabric, whereupon carrier and fabric are brought into contact for 30 seconds at 200° C using a heating plate. A second, unheated insulated plate ensures uniform contact. The dyed polyacrylonitrile fabric is then separated from the carrier. A strong, violet print is obtained.

EXAMPLE 57

With cooling, 5 parts of the carbinol base derivative of the formula

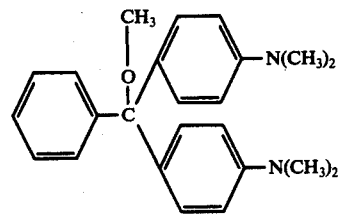

6.5 parts of ethyl cellulose, 0.15 part of the green indicator dye of the formula

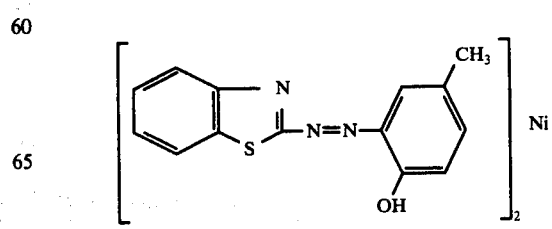

and 88 parts of ethyl alcohol are ground for 2 hours in a glass bead mill to give suspension. A carrier paper suitable for the transfer printing process is obtained by printing the resultant printing ink on transfer paper. A strong, green print is obtained on acid-midified polyacrylonitrile fabric by otherwise carrying out the prodedure described in Example 45.

We claim:

1. A dyestuff composition for use in the dry heat transfer printing process which comprises a member selected from the group consisting of water, organic solvent and mixtures thereof, said member having dispersed or dissolved therein at least one heat transferable carbinol base of cationic dye or a derivative thereof and an indicator dye which does not exhibit acid reaction and which possesses the same shade as that of the carbinol base after conversion to its salt form.

2. A composition according to claim 1 which additionally contains a binder which is heat stable below 230° C.

3. A carrier for use in the dry heat transfer process which comprises a flexible inert base sheet having applied to at least a portion of at least one face thereof a dyestuff composition according to claim 1 said composition being subsequently dried.

4. A carrier according to claim 3 wherein the base sheet is parchment paper, aluminum foil or steel foil.

5. A carrier according to claim 3 wherein the dyestuff composition contains a binder which is heat stable below 230° C.

6. A carrier according to claim 5 wherein the binder is a cellulose ether or ester, polyvinyl alcohol or mixtures thereof.

7. A carrier according to claim 5 wherein the binder employed dries rapidly to form a fine film on the carrier and is not transferred to the printing substrate under conditions of transfer printing.

8. A method for the dry heat transfer printing and dyeing of organic material which can be dyed with cationic dyes which comprises bringing a treated face of a carrier according to claim 3 into contact with the surface of an organic material which can be dyed with cationic dyes, subjecting the carrier and material while in contact to heat treatment of from 150° C to 230° C for a period of from 5 to 60 seconds to effect transfer of carbinol base to the material and separating the material from the carrier.

9. A process according to claim 8 which comprises the use of carbinol bases of cationic dyes, or derivatives thereof, the chromophoric systems of which are derived from cationic diphenylmethane, triphenylmethane, diphenylindolyl and naphtholactam dyes.

10. A process according to claim 9 which comprises the use of carbinol bases, or derivatives thereof, of the triphenylmethane class.

11. A process according to claim 8 which comprises the use of carbinol bases of naphtholactam dyes, or derivatives thereof, of the formula

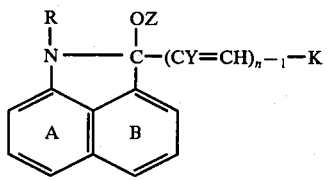

wherein R and Z are substituted or unsubstituted alkyl, cycloalkyl, aryl or aralkyl or Z is hydrogen, K is the radical of a compound which is able to couple, Y is lower alkyl, cyano or hydrogen and n 1 or 2 and wherein the rings A and B are substituted or unsubstituted.

12. A process according to claim 8 which comprises the use of carbinol bases, or derivatives thereof, of the formula

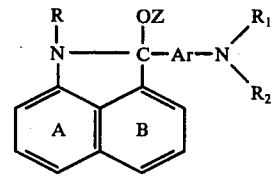

wherein Ar is an aromatic radical and each of $R_1$, $R_2$ and Z is a substituted or an unsubstituted alkyl, aryl, cycloalkyl or aralkyl group or hydrogen, and A and B are substituted or unsubstituted.

13. A process according to claim 12 which comprises the use of carbinol bases, or derivatives thereof, of the formula set forth, wherein Ar is a phenylene radical which is unsubstituted or substituted by low molecular alkyl or alkoxy groups, $R_1$ and $R_2$ and Z low molecular alkyl radicals or radicals of the benzene class and Z is halogen, and the radicals $R_1$ and $R_2$ are unsubstituted or substituted by halogen, cyano, alkoxy of 1 to 4 carbon atoms, alkyl or 1 to 4 carbon atoms, alkanoyl of 1 to 4 carbon atoms, benzoyl or carboxy.

14. A process according to claim 12 which comprises the use of carbinol bases of the formula set forth, wherein $R_1$ and $R_2$ are cyclohexyl, cyclopentyl, benzyl and β-phenylethyl, or $R_1$ and $R_2$ are linked together and form part of a saturated heterocyclic ring system or with an unsubstituted position in the aromatic ring form a heterocyclic ring.

15. A process according to claim 8 which comprises the use of carbinol bases, or derivatives thereof, of the formula

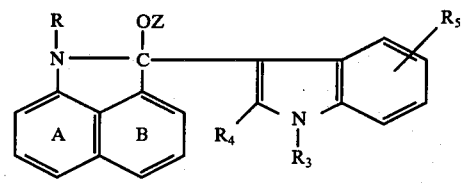

wherein $R_3$ and Z are hydrogen, aryl, aralkyl or substituted or unsubstituted alkyl or alkenyl, $R_4$ is hydrogen, aryl or low molecular alkoxy or halogen, and R, A and B are substituted or substituted.

16. A process according to claim 15 which comprises the use of carbinol bases, or derivatives thereof, of the formula set forth, wherein $R_3$ is a phenyl, tolyl, benzyl, β-phenylethyl radical or an alkyl or alkenyl radical of 1 to 18 carbon atoms which is unsubstituted or substituted by chlorine, cyano or low molecular carbalkoxy or alkylcarbonamide groups.

17. A process according to claim 8 which comprises the use of 0.1 to 10% of indicator dye, based on the carbinol bases or derivatives thereof.

18. A process according to claim 8 which comprises the use of indicator dyes in the salt form of the cationic dyes which correspond to the carbinol bases of cationic dyes.

19. A process according to claim 8 which comprises the use of indicator dyes which correspond to the shades which are obtained after transfer printing onto the printing substrate.

20. A process according to claim 8 which comprises the use of polyacrylonitrile or modacryl fibres as organic material which can be dyed with cationic dyes.

21. A process according to claim 8 which comprises subjecting carrier and organic material to be dyed to a heat treatment of 120° C to 210° C for 5 to 40 seconds under vacuum.

* * * * *